(12) United States Patent
Cibien

(10) Patent No.: US 7,513,347 B2
(45) Date of Patent: Apr. 7, 2009

(54) MECHANICAL TRANSMISSION DEVICE

(75) Inventor: Angelo Cibien, San Colombano al Lambro (IT)

(73) Assignee: Bi, Ci, Di. s.r.l., San Colombano al Lambro (IT)

( * ) Notice: Subject to any disclaimer, the term of this patent is extended or adjusted under 35 U.S.C. 154(b) by 747 days.

(21) Appl. No.: 11/122,394

(22) Filed: May 5, 2005

(65) Prior Publication Data

US 2006/0027039 A1 Feb. 9, 2006

(30) Foreign Application Priority Data

Aug. 3, 2004 (EP) .................................. 04425605

(51) Int. Cl.
*F16D 43/202* (2006.01)
*F16D 41/12* (2006.01)
(52) U.S. Cl. ........................... 192/36; 192/46; 192/54.1
(58) Field of Classification Search ................ 192/36, 192/54.1
See application file for complete search history.

(56) References Cited

U.S. PATENT DOCUMENTS 1,163,298 A * 12/1915 Winkler ................. 192/41 R
4,089,387 A * 5/1978 Cook ........................ 180/76

FOREIGN PATENT DOCUMENTS

DE 102 05 348 A 8/2002
GB 2 154 289 A 9/1985

* cited by examiner

*Primary Examiner*—Richard M. Lorence
(74) *Attorney, Agent, or Firm*—Volpe and Koenig, P.C.

(57) ABSTRACT

Device suitable for transmitting torque from a first shaft to at least one second shaft, wherein the first shaft is mechanically connected to a first cylindrical sleeve which can be mechanically coupled or uncoupled with a second sleeve mechanically connected to the second shaft and arranged in coaxially around the first sleeve, by extracting or retracting, respectively, a mobile tooth which can rotate in a seat made in the first sleeve, a third sleeve being arranged in a coaxial and rotating manner around the first sleeve and being provided with braking elements, wherein the mobile tooth is provided with a cursor suitable for sliding in a substantially radial manner in a groove made in the third sleeve, so that the relative rotation of the third sleeve with respect to the first sleeve causes the extension or the retraction of the mobile tooth according to the direction of this relative rotation.

17 Claims, 4 Drawing Sheets

MECHANICAL TRANSMISSION DEVICE

BACKGROUND OF THE INVENTION

The present invention relates to a mechanical transmission device, and in particular to a mechanical device which can transmit a torque from a drive shaft to at least one driven shaft.

In known transmission devices the drive shaft transmits a torque to a driven shaft in the rotation direction of the motor, while the driven shaft is free to rotate in the opposite direction. However, when the drive shaft is still and the driven shaft is rotated in the same rotation direction of the motor, the shafts are mutually coupled and the driven shaft is not free to rotate.

SUMMARY OF THE INVENTION

It is therefore an object of the present invention to provide a transmission device which is free from said disadvantage.

Said object is achieved with a device, the main features of which are disclosed herein.

Thanks to the particular mechanism made up of the sleeves and the mobile tooth, the transmission device according to the present invention allows to automatically couple or uncouple the driven shaft with the drive shaft when the motor is running or not, respectively, so that the driven shaft is idle, i.e. free to rotate in both directions, when the drive shaft is still.

The mobile tooth preferably rotates in its seat thanks to particular elastic means and/or according to a particular rotation angle, so as to improve and/or simplify the automatic uncoupling between driven shaft and drive shaft.

According to another particular aspect of the invention, one or more sleeves are preferably arranged in a coaxial manner around a shaft, so as to simplify the construction of the device and to reduce its size.

According to a further particular aspect of the invention, the drive shaft preferably transmits the torque to the driven shaft by means of a worm screw mechanically coupled with a toothed wheel joined in a coaxial manner to a sleeve of the device.

Thanks to the particular shape of the container and/or to the particular mutual arrangement of the shafts and of the mechanical members in this container, the device according to the present invention can be easily mounted and maintained, and has a minimum size.

BRIEF DESCRIPTION OF THE DRAWINGS

Further advantages and features of the device according to the present invention will become clear to those skilled in the art from the following detailed and non-limiting description of two embodiments thereof, with reference to the attached drawings, wherein.

DETAILED DESCRIPTION OF THE PREFERRED EMBODIMENT

Figure 1:
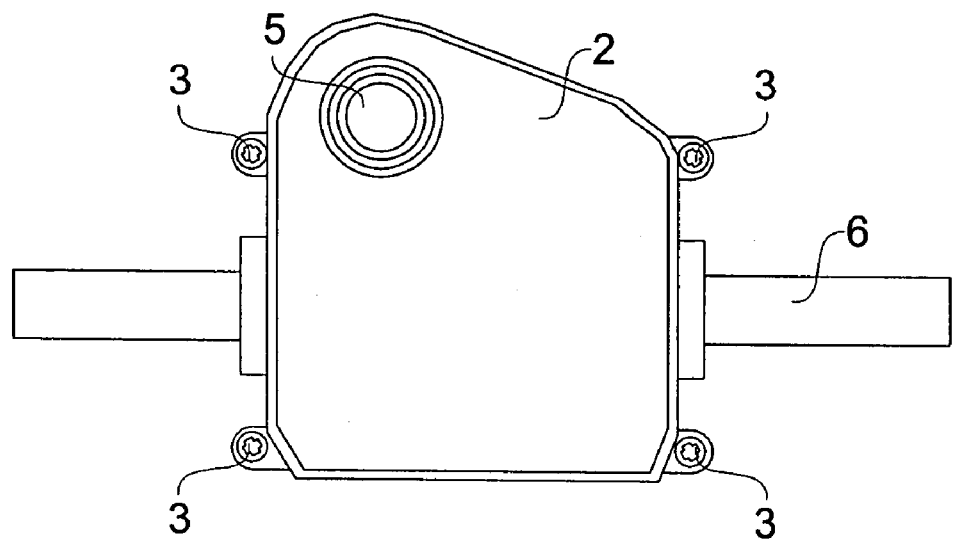
FIG. 1 shows a top view of the first embodiment of the device in the uncoupled position.
Figure 2:
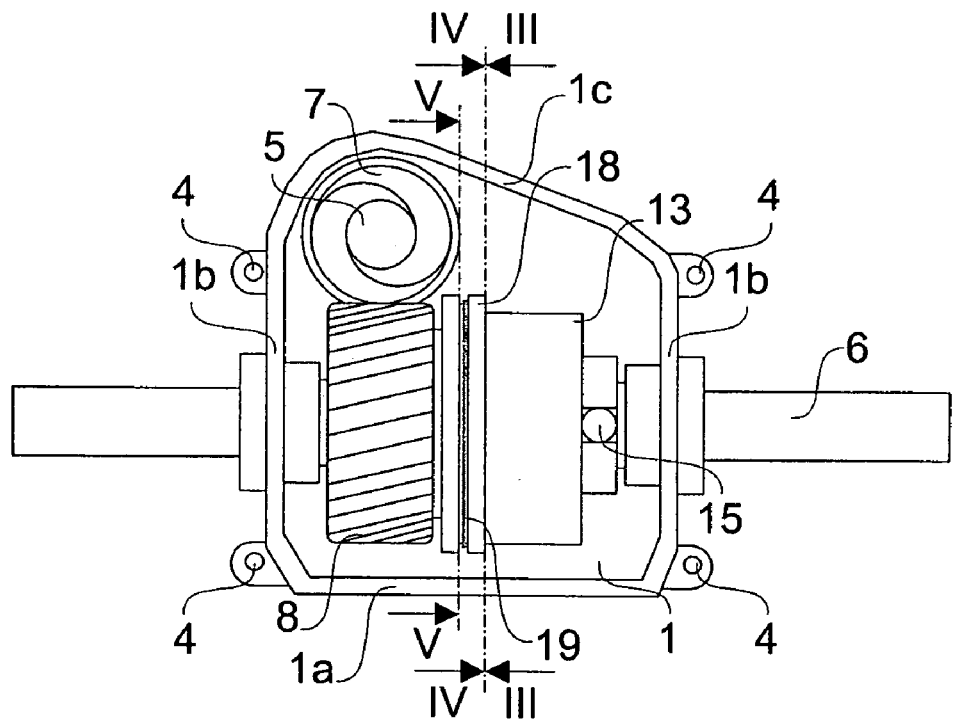
FIG. 2 shows a top view of the device of FIG. 1, without cover.

Referring to FIGS. 1 to 5, it is seen that the transmission device according to the first embodiment of the invention comprises a container 1 which is closed by an upper cover 2 by means of a plurality of screws 3 inserted into corresponding seats 4 arranged along the upper edges of container 1. The container has a substantially prismatic shape, wherein the front wall 1a is perpendicular to the two lateral walls 1b and the rear wall 1c is curved outwards. Cover 2 is provided with a hole in which a first shaft 5, in particular a drive shaft, is inserted. A second shaft 6, in particular a driven shaft, is instead arranged perpendicular to shaft 5 and crosses one or both lateral walls 1b of container 1.

A worm screw 7 mechanically coupled with a cogwheel 8 provided with an axial hole, in which the second shaft 6 is arranged in a rotating manner, is keyed on the first shaft 5, which is kept in position in container 1 by a pair of bearings 9, 10. The worm screw 7 is arranged at least partially in the curvature of the rear wall 1c of container 1. Cogwheel 8 is provided with a plurality of longitudinal holes in which an end of longitudinal pins 11 is inserted. The opposite ends of pins 11 are in turn inserted into longitudinal holes made in a first cylindrical sleeve 12 arranged in a coaxial manner beside cogwheel 8, so that this sleeve rotates together with cogwheel 8. Also the first cylindrical sleeve 12 is provided with an axial hole in which the second shaft 6 is arranged in a rotating manner. The first sleeve 12 can be mechanically coupled or uncoupled with a second sleeve 13, arranged in a coaxial manner beside and around the first sleeve 12, by extracting or retracting, respectively, at least one mobile tooth 14 which can rotate in a seat made close to the outer cylindrical surface of the first sleeve 12. The rotation angle of the mobile tooth 14 is preferably less than 45°. The second sleeve 13 is provided with an axial hole so that it can be keyed on the second shaft 6 by means of a transversal pin 15. The mobile tooth 14 is urged to its retracted position by elastic means 16, in particular by a spring made of a curved metal wire arranged around the first sleeve 12. An end of spring 16 urges the mobile tooth 14 into its seat, while the other end is locked with respect to the first sleeve 12, for example by a tooth 17 protruding from its outer cylindrical surface. A third sleeve 18 is arranged in a coaxial and rotating manner around the first sleeve 12 between cogwheel 8 and the second sleeve 13. The third sleeve 18 is provided with braking means, which in the present embodiment comprise a spring 19 made up of a curved metal wire arranged in a circular groove made around the third sleeve 18.

The ends 20 of spring 19 are bent and locked by the base of container 1, so that spring 19 is stationary with respect to container 1 and generates a friction that opposes the rotation of the third sleeve 18 with respect to container 1.

Figure 3:
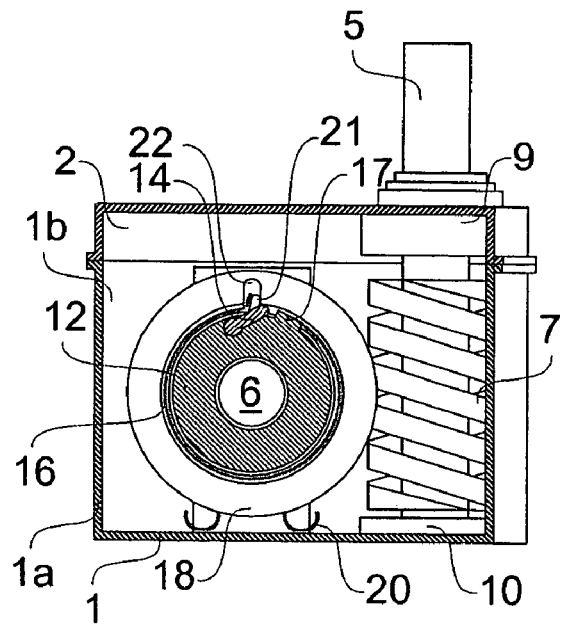
FIG. 3 shows a view cross-sectioned along plane III-III of the device of FIG. 1.
Figure 4:
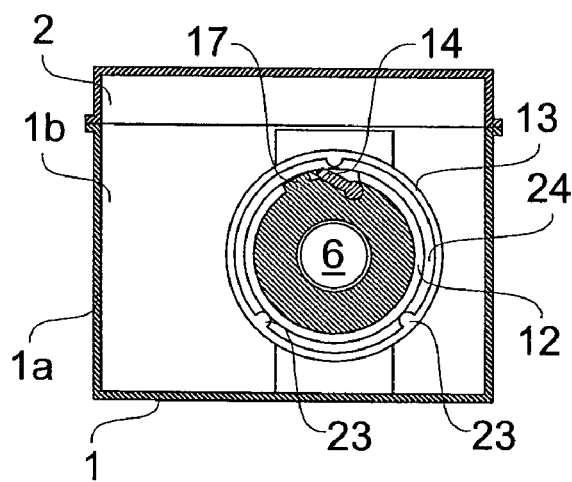
FIG. 4 shows a view cross-sectioned along plane IV-IV of the device of FIG. 1.
Figure 5:
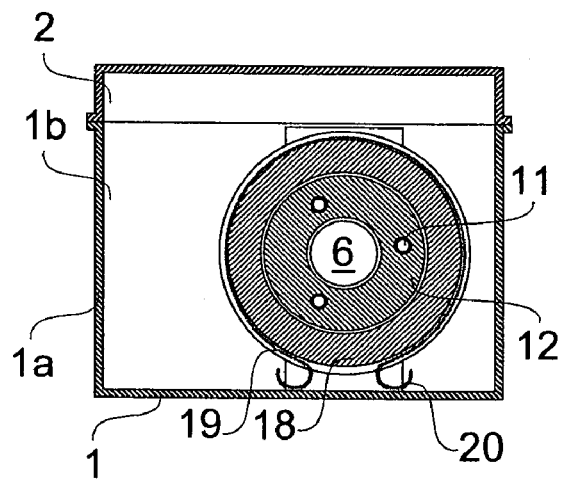
FIG. 5 shows a view cross-sectioned along plane V-V of the device of FIG. 1.

The mobile tooth 14 is provided with a cursor 21 suitable for sliding in a substantially radial manner in a groove 22 made in the third sleeve 18, so that the relative rotation of the third sleeve 18 with respect to the first sleeve 12 causes the extension or the retraction of the mobile tooth 14 according to the direction of this relative rotation between sleeves 12 and 18. In FIGS. 3 to 5 the mobile tooth 14 is shown in the retracted position, i.e. with the first shaft 5 not mechanically coupled with the second shaft 6. This condition occurs when the first shaft 5 is not rotated by external means, for example by a motor, so that cogwheel 8, the first sleeve 12 and the third sleeve 18 are still, while the second shaft 6 and the second sleeve 13 can freely rotate in both directions, since the second sleeve 13 is not mechanically coupled with the first sleeve 12.

Figure 6:
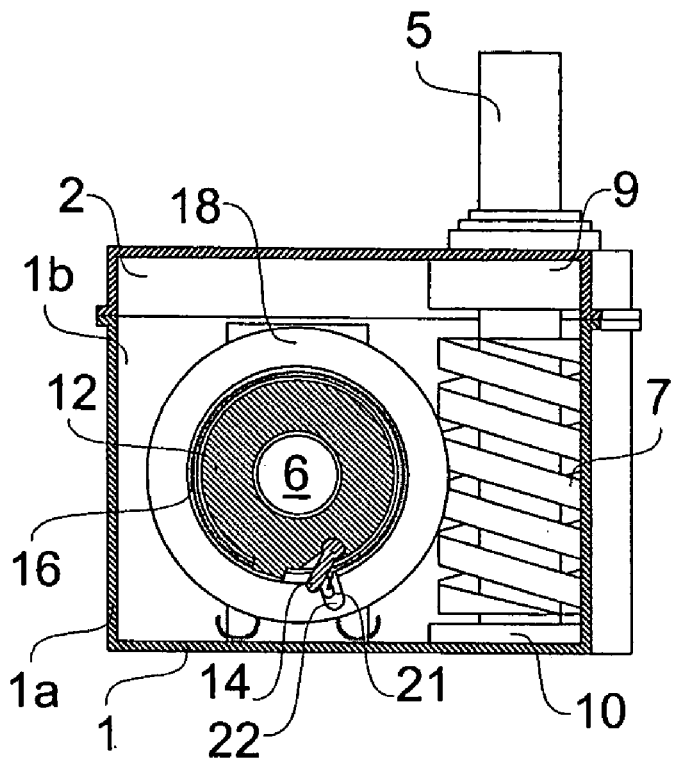
FIGS. 6 and 7 correspond to FIGS. 3 and 4, but with the device in the coupled position.
Figure 7:
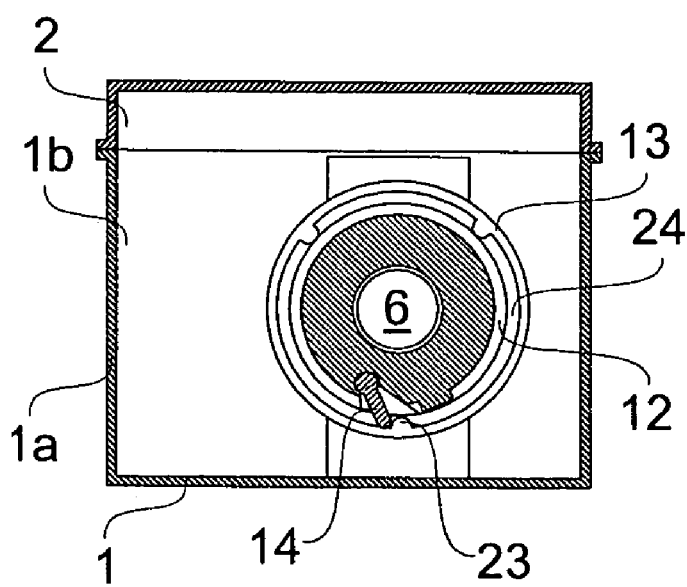

Referring also to FIGS. 6 and 7, it is seen that when the first shaft 5 is rotated, for example by a motor, in a determined direction, the rotation of the first shaft 5 is transmitted to the first sleeve 12 through the worm screw 7 and cogwheel 8. The third sleeve 18, braked by spring 19, is still or rotates slowly with respect to the first sleeve 12, so that a relative rotation is generated and the mobile tooth 14 is extracted, after which it begins to rotate together with the first sleeve 12 when the mobile tooth 14 has been completely extracted and has reached the final position in its seat. The extracted mobile tooth 14, by rotating with the first sleeve 12, hits against at least one protrusion 23 which protrudes into a cavity 24 made in the second sleeve 13 around the first sleeve 12, so that the second shaft 6 is rotated by the second sleeve 13 mutually coupled with the first sleeve 12 by means of the extracted mobile tooth 14.

When the first shaft is stopped, spring 16 urges the mobile tooth 14 into its seat, thereby slightly rotating the first sleeve 18 with respect to the first sleeve 12 and overcoming the friction generated by spring 19 that opposes this relative rotation.

If the first shaft 5 rotates in the inverse direction, the relative rotation of the first sleeve 12 with respect to the third sleeve 18 causes the retraction of the mobile tooth 14 into its seat, even if spring 16 were not present.

Figure 8:
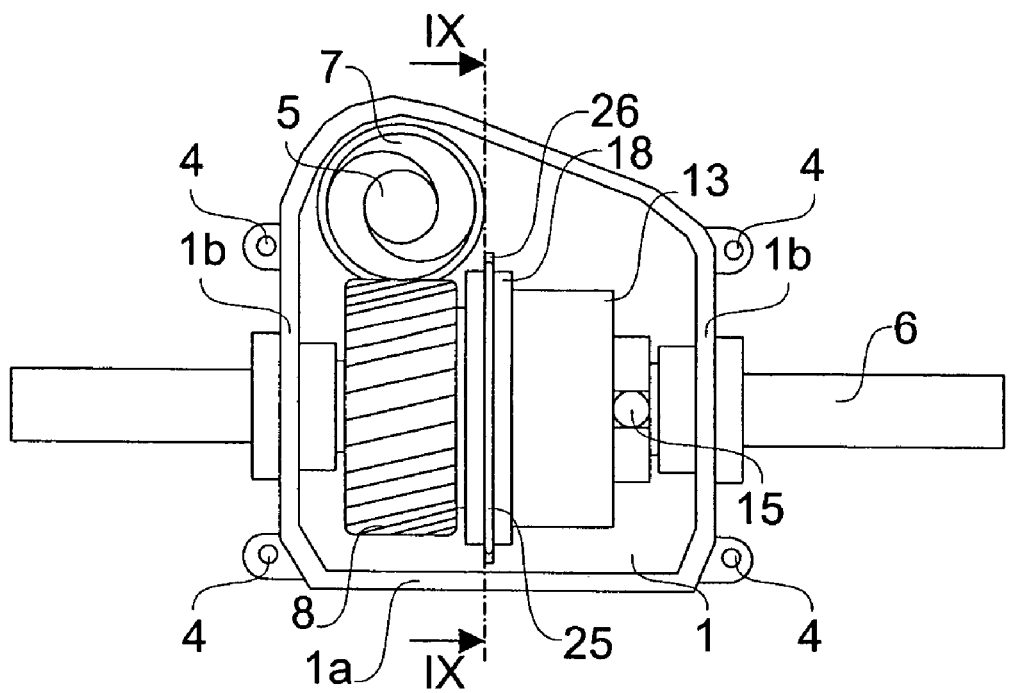
FIG. 8 shows a top view of the second embodiment of the device, without cover.
Figure 9:
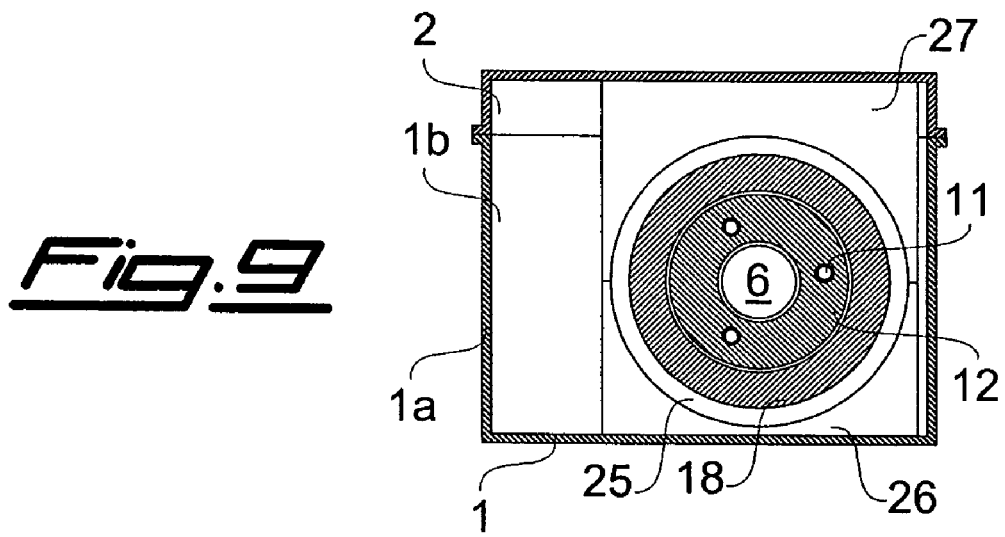
FIG. 9 shows a view cross-sectioned along plane IX-IX of the device of FIG. 8.

Referring to FIGS. 8 and 9, it is seen that in a second embodiment of the invention the braking means comprise a ring 25 made of an elastomeric material arranged between the third sleeve 18 and a pair of opposing seats, for example semicircular-shaped, made in two vertical plates 26, 27 fixed to container 1 and cover 2, respectively.

Possible modifications and/or additions may be made by those skilled in the art to the hereinabove described and illustrated embodiment while remaining within the scope of the same invention.

The invention claimed is:

1. Device suitable for transmitting a torque from a first shaft (5) to at least one second shaft (6), characterized in that the first shaft (5) is mechanically connected to a first cylindrical sleeve (12) which can be mechanically coupled or uncoupled with a second sleeve (13) mechanically connected to the second shaft (6) and arranged in a coaxial way around the first sleeve (12), by extracting or retracting, respectively, at least one mobile tooth (14) which can rotate in a seat made in the first sleeve (12), a third sleeve (18) being arranged in a coaxial and rotating manner around the first sleeve (12) and being provided with braking means (19; 25), wherein the mobile tooth (14) is provided with a cursor (21) suitable for sliding in a substantially radial manner in a groove (22) made in the third sleeve (18), so that the relative rotation of the third sleeve (18) with respect to the first sleeve (12) causes the extension or the retraction of the mobile tooth (14) according to the direction of this relative rotation.

2. Device according to claim 1, characterized in that the mobile tooth (14), extracted from the seat in the first sleeve (12), can hit against at least one protrusion (23) which protrudes into a cavity (24) made in the second sleeve (13) around the first sleeve (12).

3. Device according to claim 1, characterized in that the rotation angle of the mobile tooth (14) in the seat of the first sleeve (12) is less than 45.degree.

4. Device according to claim 1, characterized in that the mobile tooth (14) is urged in its retracted position in the seat of the first sleeve (12) by elastic means (16).

5. Device according to claim 4, characterized in that said elastic means (16) comprise a spring made up of a curved metal wire arranged around the first sleeve (12).

6. Device according to claim 5, characterized in that an end of the spring (16) urges the mobile tooth (14) into its seat of the first sleeve (12), while the other end is locked with respect to the first sleeve (12) by a tooth (17) protruding from its outer cylindrical surface.

7. Device according to claim 1, characterized in that first sleeve (12) is provided with an axial hole in which the second shaft (6) is arranged in a rotating manner.

8. Device according to claim 1, characterized in that second sleeve (13) is provided with an axial hole in which the second shaft (6) is keyed.

9. Device according to claim 1, characterized in that a cogwheel (8) is joined to the first sleeve (12) and is provided with an axial hole in which the second shaft (6) is arranged in a rotating manner.

10. Device according to claim 9, characterized in that the cogwheel (8) is mechanically coupled with a worm screw (7) keyed on the first shaft (5).

11. Device according to claim 9, characterized in that the third sleeve (18) is arranged between the cogwheel (8) and the second sleeve (13).

12. Device according to claim 1, characterized in that the sleeves (12, 13, 18) are arranged in a container (1) which is closed with an upper cover (2) provided with a hole in which the first shaft (5) is inserted, wherein the second shaft (6) is perpendicular to the first shaft (5) and crosses at least one of two lateral walls (1b) of the container (1).

13. Device according to claim 12, characterized in that the container (1) has a substantially prismatic shape, wherein a front wall (1a) is perpendicular to the two lateral walls (1b) and a rear wall (1c) is curved outwards.

14. Device according to claim 13, characterized in that the worm screw (7) is arranged at least partially in the curvature of the rear wall (1c) of the container (1).

15. Device according to claim 12, characterized in that said braking means (19; 25) comprise a spring (19) made up of a curved metal wire arranged around the third sleeve (18) and kept stationary with respect to the container (1).

16. Device according to claim 12, characterized in that said braking means (19; 25) comprise a ring (25) made of an elastomeric material arranged between the third sleeve (18) and a pair of opposing seats made in two vertical plates (26, 27) fixed to the container (1) and to the cover (2), respectively.

17. Device according to claim 1, characterized in that the first shaft (5) is a drive shaft and the second shaft (6) is a driven shaft.

* * * * *